United States Patent Office 2,991,312
Patented July 4, 1961

2,991,312
SYNTHESIS OF DIAMINES
Irving L. Mador and Louis J. Rekers, Cincinnati, Ohio, assignors to National Distillers and Chemical Corporation, a corporation of Virginia
No Drawing. Filed Sept. 14, 1956, Ser. No. 609,807
10 Claims. (Cl. 260—583)

The present invention relates to a process for preparation of diamino derivatives of dimers of diolefins and, more particularly, to such derivatives of dienes including aliphatic dienes, cyclic aliphatic dienes, and the like. More specifically, the invention relates to a process for production, from conjugated diolefins such as butadiene, isoprene and the like, of diamino derivatives of dimers of the diolefin. In additional aspects, the invention relates to certain new compositions of matter utilized as reactants in the process, as well as methods for recovery of the desired diamino product from the reaction mixture derived from the process embodied herein.

In co-pending application S.N. 514,399, filed June 9, 1955, a process is disclosed whereby a conjugated diene is subjected to reaction in an aqueous medium in presence of free amino radicals under conditions to produce a reaction mixture comprising a diamino product, in the form of a salt, corresponding to addition of two amino radicals to two units of the diene. In illustration, and by use of butadiene as the conjugated diene, butadiene is reacted in an aqueous acidic medium in the presence of free amino radicals and a suitable solvent under conditions whereby a reaction product is obtained that contains a diamino octadiene which, if desired, can be hydrogenated to the corresponding saturated $C_8$ diamine. In another co-pending application, S.N. 586,636, filed May 23, 1956, a process is set forth that is an improvement over that of S.N. 514,399 in that, by use of a controlled amount of solvent relative to the amount of water in the reaction mixture, marked and unexpected improvements in yield of the desired diamino product are obtained.

Although aqueous processes as disclosed in the aforesaid applications result in production of the desired diamino products and in substantial amount, the presence of a substantial amount of water in the reaction mixture requires resort to rather extensive and expensive operations for recovery of the desired diamino product. For example, the diamino product can be isolated from the aqueous solution by neutralizing the reaction mixture and extracting the diamino product from the neutralized (alkaline) mixture with a non-aqueous solvent. To effect such neutralization of the reaction mixture, it is necessary to neutralize the diamino product itself present in the mixture, as well as the free acid (e.g., HCl) in the mixture including the free acid present as well as free acid liberated by hydrolysis of a reductant metal salt such as $TiCl_4$ when titanous chloride is used as a reductant in the reaction with a substance such as hydroxylamine to produce free amino radicals. Hence, a very substantial amount of alkali or suitable neutralization agent is required thereby resulting in a costly operation for recovery of the diamine. In a modification of such a method, a substantial portion of the free acid (e.g., HCl) in the reaction mixture can be initially removed by distillation but such a method appears to result in hydrolysis of $TiCl_4$ (when titanous chloride is used as the reductant) to a form of $TiO_2$ that is insoluble in the acid reaction mixture and, additionally, some deterioration of the diamine product appears to occur as, for example, when the reaction mixture is distilled at atmospheric pressure to remove about one-half of the total acid (e.g., HCl). Thus, it is highly desirable to provide a process for the preparation of products corresponding to diamino derivatives of dimers of the dienes whereby the reaction mixture containing the diamino product can be treated for recovery of the diamine in less extensive and less expensive manner than is required for isolation of the diamine from substantially aqueous reaction mixtures. The object of this invention is the provision of such a process including preparation of reaction mixtures comprising the desired product, its isolation and recovery, and certain novel reactants utilized in preparation of the desired diamino product. Other objects and advantages obtained from practice of the invention will be apparent from the more detailed description thereof set forth hereinafter.

The process embodied herein comprises reacting a diolefin in a suitable non-aqueous reaction medium in presence of free amino radicals under conditions to produce a product corresponding to a product of addition of two amino radicals to two units of the diolefin. As is described more fully hereinafter, preparation of the desired diamines by such a method enables the recovery of the diamine in a highly facilitated and economical manner as, rather than requiring resort to neutralization such as is required with aqueous reaction mediums, the diamine product in the reaction mixture from the process embodied herein may be subjected to extraction with a suitable non-solvent to precipitate the diamine in the form of its salt from which the free diamine can be liberated and obtained in substantially pure form. Thus, in an embodiment, the process comprises reacting a conjugated diene such as butadiene in a suitable non-aqueous solvent (e.g., an alcohol) in the presence of free amino radicals produced by oxidation-reduction reaction between a reductant metal salt (e.g., titanous chloride) and a hydroxylamine (e.g., hydroxylamine hydrochloride) whereby there is produced a reaction mixture comprising a dihydrochloride salt of a diaminooctadiene. The latter salt may then be precipitated from solution by addition of diethyl ether, and the precipitated salt may then be hydrogenated in aqueous solution in presence of a suitable hydrogenation catalyst, followed by liberation of the free diamine to provide a diamine-water layer from which the diamine ($C_8$) can be recovered by distillation. In another embodiment, the process is carried out in continuous manner, wherein the titanium tetrachloride (when titanous chloride is used as a reductant) in the reaction mixture is reduced back to titanous by catalytic reduction with hydrogen, and the titanous is recycled to the reaction in which formation of the diamino derivatives of the dimer of the diene is being carried out. Other embodiments and additional improved aspects of the process embodied herein are set forth in the specific examples presented hereinafter.

For providing free amino radicals in a process as embodied herein, a suitable method involves the use of a hydroxylamine for oxidation-reduction reaction with a suitable reductant metal salt whereby liberation of a free amino radical occurs. For example, a suitable method for providing free amino radicals is the use of a hydroxylamine salt (e.g., hydroxylamine hydrochloride) and a reductant metal salt such as titanous chloride, titanous nitrate, titanous acetate, stannous chloride, manganous chloride, vanadous chloride, and the like, which undergo oxidation-reduction reaction with the hydroxylamine and, as is illustrated by use of a titanous salt, to form a free amino radical as follows:

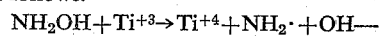

$$NH_2OH + Ti^{+3} \rightarrow Ti^{+4} + NH_2 \cdot + OH^-$$

Although such a free radical system is suitable for practice of this invention, and hence has been utilized for illustrating the specific embodiments set forth hereinafter, other methods that form a free amino radical may be employed. Such other methods include photolytic or nuclear radiation-induced decomposition of substances such as ammonia, hydrazine or hydroxylamine; chemical reduction of substances such as discharge of amide ion, etc.

With reference to the embodiment utilizing a hydroxylamine as the source of the free amino radicals, the hydroxylamine can be used in the form of a salt thereof either as a solid or as a solution in a suitable solvent. A particularly preferred salt is hydroxylamine hydrochloride but also contemplated for such usage are hydroxylamines in the form of other salts such as those of nitric acid, sulfuric acid, suitable organic acids, and the like. Alternatively, as a source of substituted amino radicals, mono- or di-substituted hydroxylamines may be used of the general formula

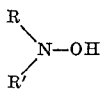

where R and R' are organic radicals, examples of which are N-benzyl hydroxylamine and N-phenyl hydroxylamine, or where R and R' together form a substituted methylene group of the structure R''=NOH, an example of which is acetone oxime.

In carrying out the process of this invention, the reaction between the diolefin and the free amino radicals is carried out in a non-aqueous solvent that is inert with respect to the reactants and the diamine product. For such a purpose, certain oxygen-containing organic solvents are suitable, such for example, hydroxylic organic solvents, including the alcohols of the methanol series and particularly the relatively low molecular weight members of that series such as methanol, ethanol, isopropanol, and the like; and, generally, such alcohols of from 1 to 4 carbon atoms. Mixtures of such alcohols can also be used as well as mixtures thereof with other substances, such as diethyl ether, dioxane, dimethyl Cellosolve, benzene, etc. Specific mixtures include those of methanol and dioxane, methanol and ethanol, etc. Preferably, the solvent or solvent mixture should have a solubility for the hydroxylamine salt sufficiently great that the reaction may proceed at a reasonable rate; and a relatively low solubility for the diamine salt so that it may be precipitated by addition of a minimum amount of a suitable non-solvent. If desired, the hydroxylamine salt may be added in solution in one solvent and the titanous chloride in another in which case it is desirable that the solvents be chosen so that the solubility in each case be high. Where the final solution of titanium tetrachloride is recycled, it may be advantageous that the solvent for the hydroxylamine salt be lower boiling so that it may be removed by distillation.

The process embodied herein may be carried out with use of a diene of which butadiene is particularly well adapted. However, the process may be carried out with use of other conjugated dienes, including for example, such dienes of from four to eight carbon atoms and, specific examples of which include isoprene, dimethyl butadiene, the pentadienes, such as methyl 1,3-pentadiene, as well as cyclic dienes such as cyclohexadiene-1,3 and cyclopentadiene. Depending on the particular diene employed, the process embodied herein is directed to the preparation of diamino dimers of the diene.

For the described reaction, the temperature employed may be varied over a rather wide range such, for example, from —30° to about 75° C. with a preferred range being about 0° to about 40° C. Though temperatures lower than about 0° C. can be used, they are generally not preferred as the reaction rate tends to decrease whereas temperatures higher than about 40° C. though suitable due to an increase in rate of reaction, require use of more expensive pressurized vessels.

In carrying out the reaction that results in formation of diamino products corresponding to addition of two amino radicals to two units of the diene, and which reaction may be illustrated by use of hydroxylamine and titanous chloride for formation of the free amino radicals, the hydroxylamine (e.g., hydroxylamine hydrochloride) and titanous chloride are generally used in equivalent amounts to obtain substantially complete utilization of these reagents. In certain instances, however, to protect the reacted solution against oxidation, an excess (e.g., about 5%) of titanous chloride may be introduced. The diene may be present in stoichiometric amount or in excess such, for example, up to about an eight fold excess but, preferably, from about 1.3 to about 2.0 equivalents are used with the excess diene being recovered, if desired, at the conclusion of the reaction.

The hydroxylamine and titanous chloride may be added concurrently to the reaction mixture and, preferably, the hydroxylamine is maintained in excess to minimize the following reaction:

Either or both the hydroxylamine and the titanous chloride may be added in solution or as a solid. With respect to the diene, all of the diene may be added initially or, if desired, it may be metered in during the course of the reaction, preferably at a rate such as to maintain an excess of diene in the mixture undergoing reaction.

In the use of a reductant metal salt, such as titanous chloride, for the reaction to form the free amino radicals, it may be used in the form of a solid alcoholate or as a solution in a solvent, preferably the reaction medium employed for the diamine-forming reaction. To prepare such compounds (e.g., alcoholates of titanous chloride), a concentrated solution of $TiCl_4$ in a suitable alcohol (e.g., methanol) may be subjected to catalytic hydrogenation to reduce the $TiCl_4$ to titanous chloride in an amount that exceeds the solubility of the titanous compound in the solvent for the $TiCl_4$; or an alcohol solution of titanous chloride may be subjected to distillation to remove the solvent and precipitate the solid titanous compound.

For reduction of $TiCl_4$ to form the titanous chloride, the solution of the $TiCl_4$ can be subjected to hydrogen under pressure (e.g., from about 14 up to several thousand pounds per sq. inch) in the presence of a suitable catalyst such as Adams catalyst, platinum on carbon, palladium on carbon, and others.

For recovery of the diamine salt from the reaction mixture, it can be precipitated from the reaction mixture (e.g., alcoholic) by the addition of a suitable non-solvent for the diamine salt and, suitable therefor are substances such as dimethyl Cellosolve, methylene chloride, diethyl ether, etc. The non-solvent can then be removed by distillation and the residual solution of $TiCl_4$ in the reaction medium (e.g., alcohol) can be reduced to titanous by catalytic hydrogenation and used as the reductant in the free amino radical-forming reaction.

Alcoholic solutions of $TiCl_4$ contain free HCl due to esterification to the di-substituted stage

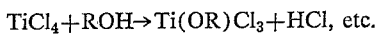

The amount of hydrochloric acid may be decreased by distillation or by adding anhydrous ammonia whereby ammonium chloride is precipitated. The hydrochloric acid may be increased by addition of the anhydrous gas. Any of the steps of reduction to titanous chloride, dimerization, and precipitation of the diamino product with ether as embodied herein may be carried out with more or less than the normal hydrochloric acid concentration resulting from the esterification. Generally, it is suitable to perform these steps without effecting any change in the normal concentration.

Based on the volume of the reaction mixture and depending on the diamine concentration three to six volumes of ether are generally required, but these concentrations may be increased or decreased to meet particular requirements. The amount may be reduced by concentrating the solution by distillation of methanol. More conveniently, the amount of ether is reduced by carrying over diamine product from a previous reaction. In a cyclic process, a steady state concentration of diamine can be left unrecovered to the extent of a partial inventory to one or more inventories, depending on the amount of ether it is desirable to employ whereby the amount of ether required to effect precipitation is decreased as the amount of diamine product carried over from previous reactions is increased.

A low concentration of water can be tolerated in the method of recovery based on addition of a non-solvent. Water will be present, arising from the reduction of the hydroxylamine, to the extent of one mole per mole of hydroxylamine reduced. In a cyclic process the continuous build-up of the water concentration can be avoided by removing water by chemical means, e.g., drying with anhydrous calcium sulfate; or by removing the water by distillation, e.g., distilling a 95:5 ethanol-water azeotrope. Generally, the water concentration should be kept to an absolute minimum and it is highly desirable that no water be added to the reaction initially.

In order to further describe the invention, several embodiments thereof are set forth hereinafter. With respect thereto, however, it should be understood that such embodiments are set forth for illustrative and not limitative purposes.

Example 1

A solution of 27.5 ml. (0.25 mole) of titanium tetrachloride in 160 ml. methanol was hydrogenated at 50 p.s.i. with Adams catalyst. After reduction, titration of an aliquot with a standard solution of ferric ammonium sulfate showed a 78% conversion to titanous. The remaining portion of this solution containing 0.184 mole titanous was added dropwise to a reaction flask fitted with stirrer and Dry Ice reflux condenser. The flask contained 25 ml. methanol and 1.0 mole butadiene. Concurrently with addition of the titanous, a solution was added of 12.8 g. hydroxylamine hydrochloride dissolved in 150 ml. methanol. The rates of addition were approximately equivalent on a stoichiometric basis with the hydroxylamine in slight excess in the flask so that the blue color of the titanous was rapidly discharged. The additions were made over a one hour period. The refluxing of the butadiene served to maintain the temperature of the reaction at approximately 0° C. At the end of the reaction a solid was filtered off containing octadiene diamine and some titanic salt. The filtrate was reduced in volume by approximately one-half by distillation of methanol under vacuum and the residue was added to an aqueous solution containing 20% sodium hydroxide. The resulting solution was extracted with diethyl ether and the ether extract was dried. Addition of anhydrous hydrochloric acid to the ethereal solution gave a precipitate of diamine octadiene hydrochloride weighing 9.6 grams and corresponding to a 49% yield based on the titanous and hydroxylamine in the reaction. The diamine was identified by its infrared spectrum in comparison to a known sample of octadiene-3,6-diamine-1,8 and by the melting point of its hydrochloride.

Example 2

An experiment was performed on a 0.334 mole scale in essentially the same manner as Example 1 except that instead of butadiene, a solution of 52.6 ml. isoprene in 50 ml. methanol was added dropwise over the reaction period. Dimethyl octadiene diamine hydrochloride was recovered, 16.45 g., corresponding to a 42% yield of theoretical. By its infrared spectrum the product was shown to be an unsaturated amine. Nitrogen analysis of the hydrochloride derivative gave 11.1%; calculated, 11.6%.

Example 3

An experiment was performed essentially the same as Example 1 except that the hydroxylamine hydrochloride was added as a solid to the flask at the start of the reaction. The diamine recovered was 53.5% of theoretical.

Example 4

An experiment was performed essentially the same as Example 1 except that the methanol in all cases was replaced by ethanol in somewhat larger volumes. Octadiene diamine was recovered in 80% yield based on 0.109 mole each of hydroxylamine and titanous.

Example 5

An experiment was performed essentially the same as Example 1 except that the excess of butadiene was only 50% over the theoretical and it was metered in continuously over the reaction period. No solid was found in the reaction flask at the end of the reaction. The reaction temperature was in the range of 21° to 25° C. One-half of the reaction mixture in aqueous alkali solution was ether extracted and the extracts dried. Removal of solvent by evaporation left a residue of 6.96 g. octadiene diamine corresponding to a 59% yield of theoretical. To the other half of the reaction mixture representing a volume of 235 ml., 700 ml. of ether was added. A precipitate of crude octadiene diamine hydrochloride formed weighing 12.3 g. or a 70% yield of theoretical. This precipitate contained as an impurity a titanic salt and analysis showed titanium present as 2.25%. The diamine hydrochloride content was determined as 90% giving a corrected yield of 63% for the reaction by this method of product recovery.

Example 6

A solution containing 41.8 ml. (0.380 mole) of titanium tetrachloride in 200 ml. of methanol was reduced under 685 p.s.i. hydrogen pressure, with Adams catalyst. Titration of an aliquot showed an 87.1% conversion to titanous. The remaining titanous solution was added dropwise over a 70 minute period to a reaction flask containing 22.6 g. (0.323 mole) hydroxylamine hydrochloride and 234 ml. methanol. One-half mole of butadiene was metered into the flask during this period. The reaction temperature was held at approximately 24° C. by an external cooling bath. At the end of the reaction the volume was reduced to 265 ml. by distillation at reduced pressure of methanol and excess butadiene. The addition of three volumes of ether gave a precipitate weighing 35.9 g. corresponding to a yield of 105% calculated as octadiene diamine hydrochloride, the overage on the yield figure deflecting contamination with titanic salt. Analysis of the precipitate showed 80% as octadiene diamine hydrochloride or an 85% yield for this run. The ether from the filtrate was removed by distillation and the residual solution of titanium tetrachloride in methanol reduced again to titanous.

The reaction was repeated on a 0.266 mole scale yielding 35.0 g. of product. The combined products of the two experiments were dissolved in water and hydrogenated to reduce the double bonds of the diamine. The solution was then made alkaline with sodium hydroxide whereupon titanium dioxide precipitated and two layers separated. The diamine-rich layer was distilled at reduced pressure giving 12.96 g. of pure, white, 1,8-octanediamine.

Example 7

An experiment was performed essentially the same as Example 6 except that the precipitation of product with ether at the end of the first reaction was omitted. At the end of the second reaction, instead of three volumes of ether, only one volume was added. A precipitate of crude diamine hydrochloride weighing 57.4 g. was obtained.

Example 8

A solution was prepared containing 0.036 mole titanium tetrachloride, 0.250 mole hydroylamine and 0.325 mole butadiene in 100 ml. methanol. The solution was hydrogenated at 1000 p.s.i. hydrogen pressure with Adams catalyst. By the method of solution in aqueous caustic and extraction, octadiene diamine was isolated. The final reaction mixture contained 0.087 mole of unreacted hydroxylamine. Based on the hydroxylamine consumed, the yield of diamine was 24.0% of theoretical.

The diamino products produced by practice of this invention possess utility for many purposes and, particularly, are suitable upon hydrogenation to provide saturated, relatively high molecular weight amines that are useful for reaction with dibasic acids, such as sebacic acid, adipic acid, and the like, to form synthetic linear polyamides that are fiber-forming into fibers of excellent cold-draw characteristics. For example, the $C_8$ unsaturated diamines, produced by the embodiments described and subjected to hydrogenation to the corresponding saturated $C_8$ diamines, provide upon being subjected to condensation polymerization conditions with an acid such as sebacic acid, adipic acid and the like, synthetic linear condensation polyamides that are fiber-forming to fibers of excellent cold-draw characteristics.

Although it is not intended that the invention be bound by any theory as to particular reactions that occur in the processing of conjugated dienes to produce the diamino unsaturated derivatives thereof as embodied herein, it is believed that the following reactions occur when, for illustrative purposes, the reactants include butadiene and the free radical is an $NH_2 \cdot$ radical such as formed by oxidation-reduction reaction of hydroxylamine hydrochloride and titanous chloride.

$$NH_2 \cdot + C_4H_6 \rightarrow NH_2C_4H_6 \cdot$$
$$2NH_2C_4H_6 \cdot \rightarrow (NH_2C_4H_6^-)_2$$

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of diamino dimers of lower molecular weight aliphatic hydrocarbon conjugated diolefins which comprises, in a liquid phase reaction, subjecting substantially one equivalent of hydroxylamine to oxidation-reduction reaction with substantially one equivalent of a metal salt from the group consisting of titanous chloride, vanadous chloride, stannous chloride, manganous chloride, titanous nitrate and titanous acetate in a substantially non-aqueous alcoholic medium in which is dissolved from about one to about eight equivalents of a lower molecular weight aliphatic hydrocarbon conjugated diolefin, said alcoholic medium being a saturated aliphatic hydrocarbon monohydric alcohol, thereby producing a reaction product mixture containing a diamino dimer of said diolefin.

2. A process, as defined in claim 1, wherein the solvent is an alcohol of the methanol series.

3. A process, as defined in claim 2, wherein the alcohol contains one to four carbon atoms.

4. A process, as defined in claim 1, wherein the diolefin is butadiene, the alcoholic solvent is an alcohol of the methanol series, the metal salt is titanous chloride, and the reaction is carried out at from about −30 to about 75° C.

5. A process, as defined in claim 1, wherein the hydroxylamine is in the form of its hydrochloric acid salt.

6. A process, as defined in claim 1, wherein the hydroxylamine is used as its hydrochloric acid salt, to produce a reaction product mixture comprising a dihydrochloride salt of a diamino dimer of the diolefin, and the reaction medium contains an inert liquid substantially non-aqueous organic ether that is a substantially non-solvent for the dihydrochloride salt of the diamino dimer.

7. A process, as defined in claim 1, wherein the diamino product in the reaction mixture is precipitated by addition to said mixture of an organic ether non-solvent for said diamino product.

8. A process, as defined in claim 1, wherein the conjugated diolefin contains four to eight carbon atoms, the solvent is a monohydric saturated aliphatic alcohol of one to four carbon atoms, the hydroxylamine is in the form of hydroxylamine hydrochloride and the metal salt is titanous chloride to produce a reaction mixture that contains a dihydrochloride salt of a diamino dimer of said diolefin.

9. A process, as defined in claim 6, wherein an organic ether that is a non-solvent for the dihydrochloride salt of the diamino dimer is added to the reaction mixture to precipitate the dihydrochloride salt of the diamino dimer salt.

10. A process, as defined in claim 9, wherein the titanium tetrachloride, formed by the oxidation-reduction reaction of the hydroxylamine with titanous chloride, and in solution in the alcoholic reaction mixture from which the diamine salt has been precipitated is reduced to titanous chloride by subjecting the reaction mixture containing the dissolved titanium tetrachloride to an elevated pressure of hydrogen of up to about one thousand p.s.i. in presence of a metal hydrogenation catalyst for reduction of said titanium tetrachloride to titanous chloride, and the resulting alcoholic solution of titanous chloride is recycled to the process for oxidation-reduction reaction with the hydroxylamine salt.

References Cited in the file of this patent

UNITED STATES PATENTS

| | | |
|---|---|---|
| 2,486,572 | Olson et al. | Nov. 1, 1949 |
| 2,565,529 | Smith | Aug. 28, 1951 |
| 2,567,109 | Howard | Sept. 9, 1951 |
| 2,617,827 | McKeever et al. | Nov. 11, 1951 |
| 2,670,270 | Jordon | Feb. 23, 1954 |

OTHER REFERENCES

Schumb et al.: Journal American Chem. Soc., vol. 55, pp. 596–597 (1933).

Davis et al.: Jour. Chem. Soc., pp. 2563–2567 (1951), Part III.